US010480678B2

(12) United States Patent
Jacobsen et al.

(10) Patent No.: US 10,480,678 B2
(45) Date of Patent: Nov. 19, 2019

(54) ERGONOMETRIC FAUCET HANDLE WITH CHANGEABLE SHAPE BODY

(71) Applicant: Newco Enterprises, Inc., St. Charles, MO (US)

(72) Inventors: Jody G. Jacobsen, Defiance, MO (US); John David Santy, Jr., La Vernia, TX (US); Deborah L. Absalon, La Vernia, TX (US)

(73) Assignee: Newco Enterprises, Inc., St. Charles, MO (US)

( * ) Notice: Subject to any disclaimer, the term of this patent is extended or adjusted under 35 U.S.C. 154(b) by 0 days.

(21) Appl. No.: 15/807,534

(22) Filed: Nov. 8, 2017

(65) Prior Publication Data

US 2018/0142805 A1 May 24, 2018

Related U.S. Application Data

(60) Provisional application No. 62/419,438, filed on Nov. 8, 2016.

(51) Int. Cl.
*F16K 31/60* (2006.01)
*B67D 3/04* (2006.01)

(52) U.S. Cl.
CPC ............ *F16K 31/602* (2013.01); *B67D 3/043* (2013.01)

(58) Field of Classification Search
CPC ........ F16K 31/602; B67D 3/043; Y10T 16/44
See application file for complete search history.

(56) References Cited

U.S. PATENT DOCUMENTS

| 843,996 | A | * | 2/1907 | Broomell | F16K 31/602 251/297 |
| 1,238,023 | A | * | 8/1917 | Kleinman | F16K 31/602 251/99 |
| 1,716,397 | A | * | 6/1929 | Warner | B67D 3/043 251/144 |
| 1,796,721 | A | * | 3/1931 | Price | F16K 31/602 16/110.1 |
| 1,990,957 | A | * | 2/1935 | Ridges | A45D 42/08 15/143.1 |
| 2,543,528 | A | * | 2/1951 | Kaufmann | A47J 31/043 99/285 |
| 2,782,454 | A | * | 2/1957 | Baer | A47J 45/071 16/431 |
| 3,026,006 | A | * | 3/1962 | Frankfurt | B67D 1/0418 222/400.7 |
| 3,337,184 | A | * | 8/1967 | Koch | F16K 31/56 251/263 |
| 5,231,727 | A | * | 8/1993 | Armbruster | B24B 23/00 15/144.1 |
| 5,933,916 | A | * | 8/1999 | Loschelder | F16K 31/602 16/110.1 |
| 6,752,730 | B1 | * | 6/2004 | Brine, Jr. | A63B 60/48 473/513 |

(Continued)

*Primary Examiner* — Victor D Batson
*Assistant Examiner* — Matthew J Sullivan
(74) *Attorney, Agent, or Firm* — Matthews Edwards LLC

(57) ABSTRACT

A handle for a beverage dispensing faucet, having an ergonometric size and shaped body that is easy to grasp and lightweight, the handle being configured to allow quickly and easily changing or selecting from different shape ergonometric bodies using specially shaped adapters having mounting elements shaped to the different shape bodies.

15 Claims, 5 Drawing Sheets

(56) References Cited

U.S. PATENT DOCUMENTS

| | | | | |
|---|---|---|---|---|
| 7,178,247 | B2* | 2/2007 | Currie | A47G 21/02 |
| | | | | 16/110.1 |
| 8,715,299 | B2* | 5/2014 | Menn | A61B 17/1285 |
| | | | | 606/142 |
| 9,821,449 | B2* | 11/2017 | Chen | B25G 3/24 |
| 9,849,579 | B2* | 12/2017 | Gauthier | B25G 1/10 |
| 2010/0162528 | A1* | 7/2010 | Chen | B25G 1/10 |
| | | | | 16/422 |
| 2014/0225019 | A1* | 8/2014 | Yin | F16K 31/602 |
| | | | | 251/234 |

* cited by examiner

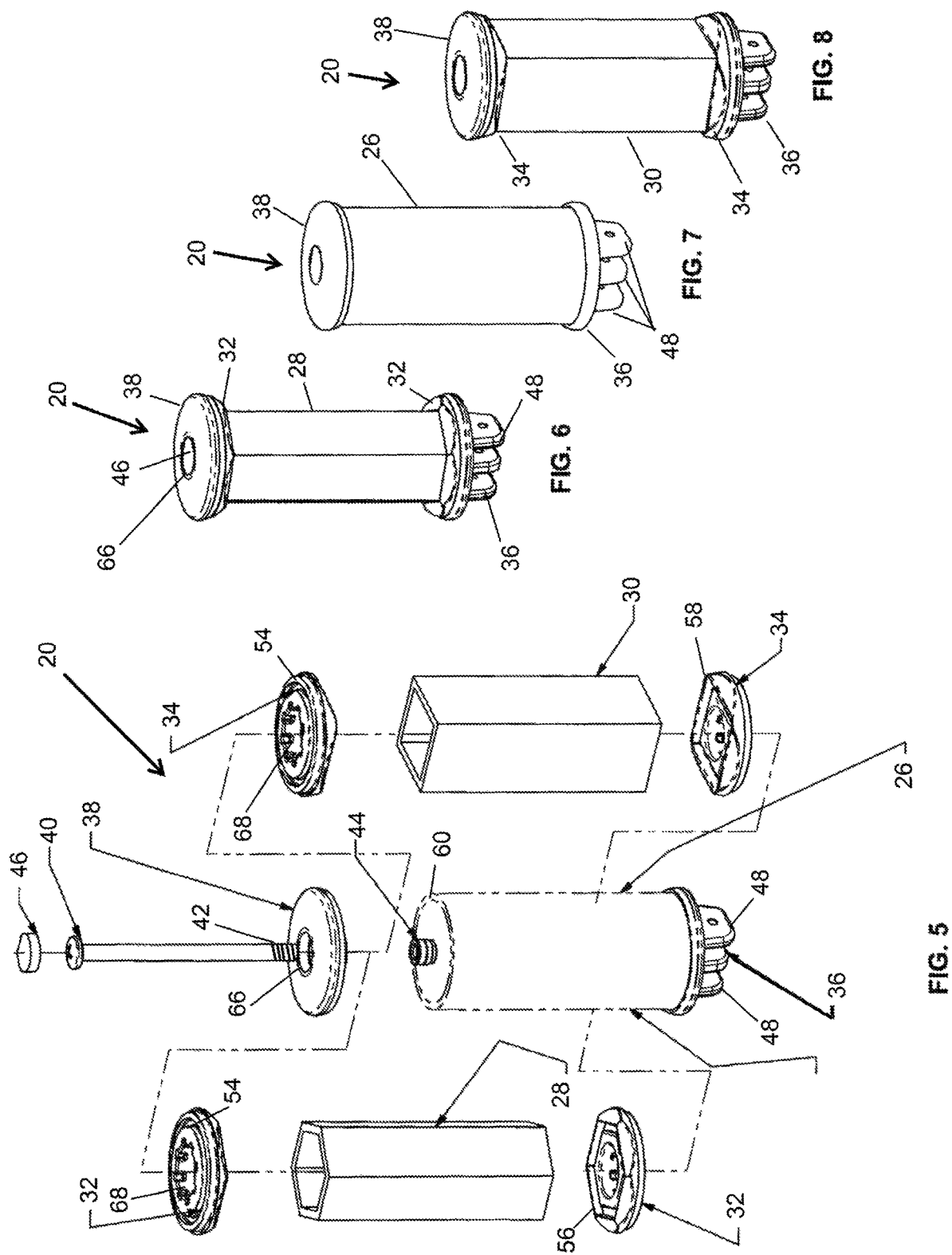

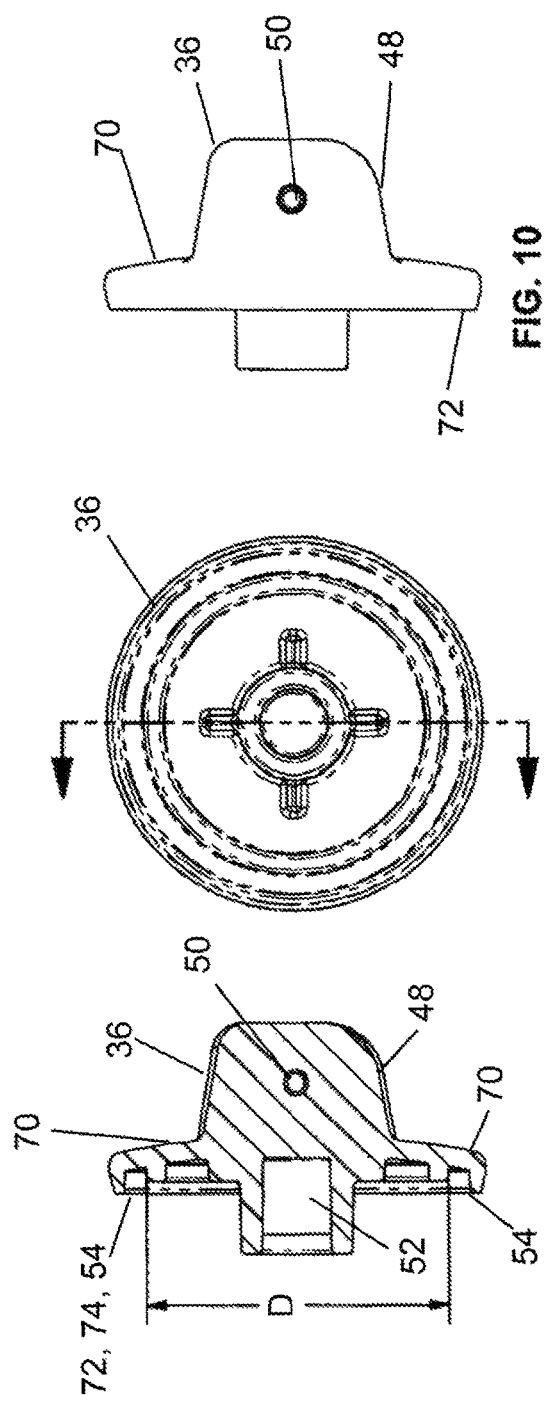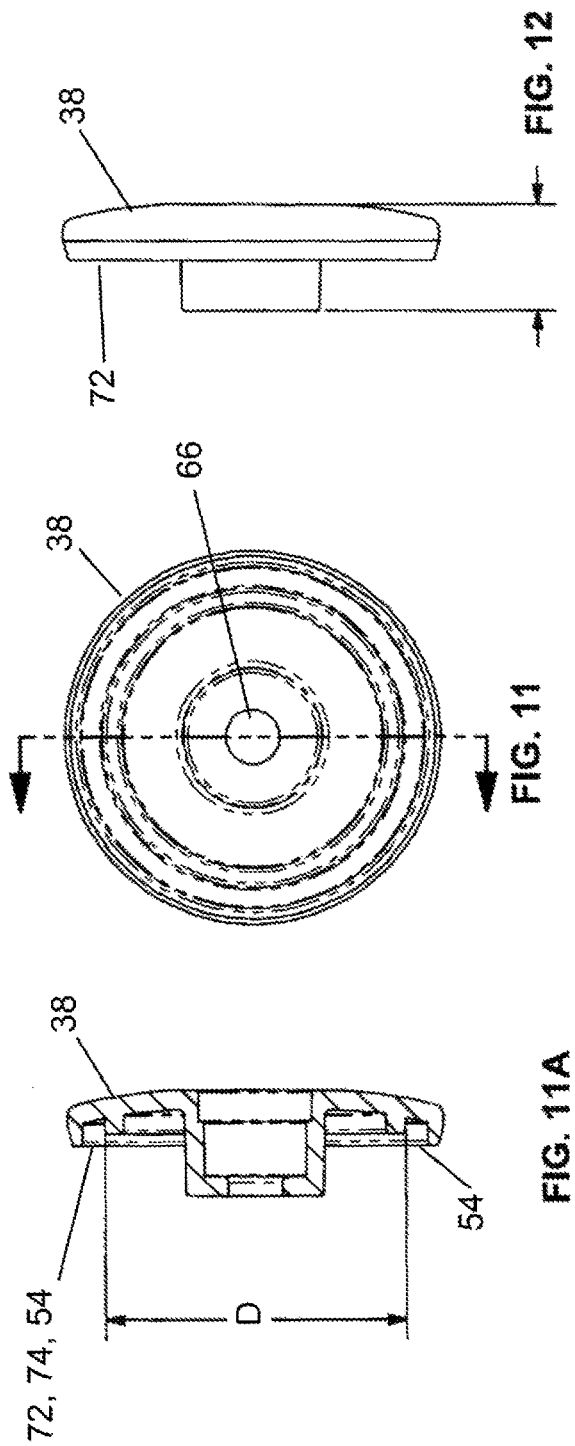

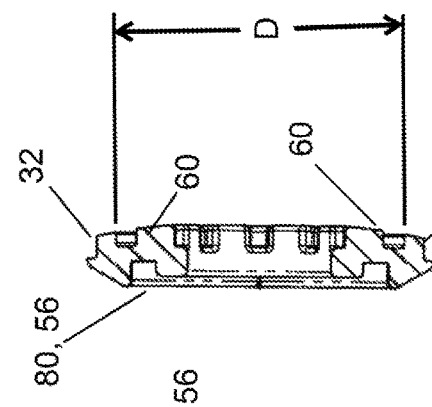
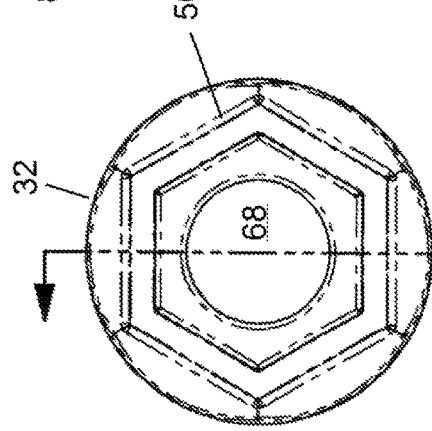
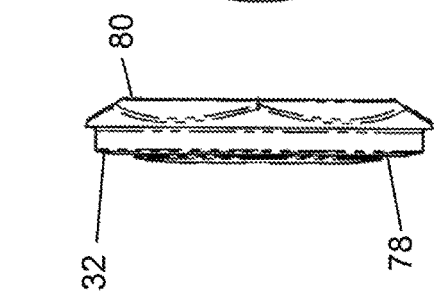
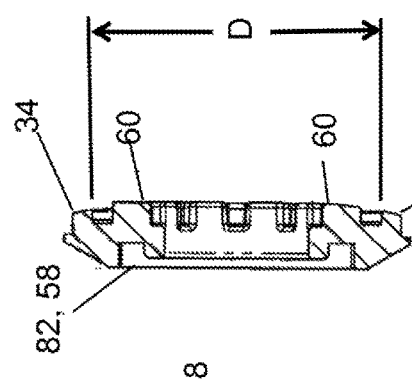
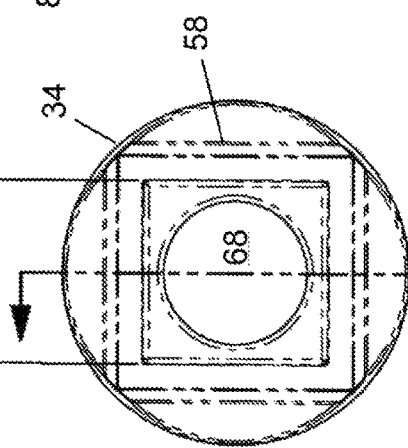
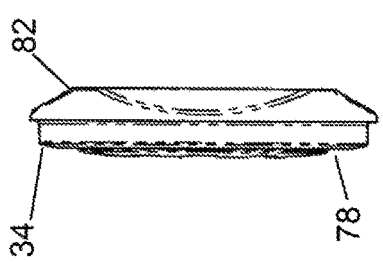

ERGONOMETRIC FAUCET HANDLE WITH CHANGEABLE SHAPE BODY

This application claims the benefit of U.S. Provisional Application No. 62/419,438, filed Nov. 8, 2016.

TECHNICAL FIELD

The invention relates generally to a handle for a faucet, and more particularly, for dispensing beverages from urns, decanters, jugs, and the like commonly employed for making, holding and dispensing brewed beverages such as coffee and tea, and non-fermented beverages such as lemonade, juices and the like, which handle has an ergonometric size and shaped body that is easy to grasp and operate and lightweight, the handle being configured to allow quickly and easily changing or selecting from different ergonometric bodies as desired or required for a particular application or customer preference.

BACKGROUND ART

U.S. Provisional Application No. 62/419,438, filed Nov. 8, 2016, is incorporated herein by reference in its entirety.

The standard faucets for bulk liquid beverage holding vessels such as urns, decanters, jugs, and the like commonly employed for making, holding and dispensing brewed beverages such as coffee and tea, and non-fermented beverages such as lemonade, juices and the like, typically employ a spring operated valve having a normally closed position. Commonly, the valve will comprise a valve member with a rubbery valve seal or cup about it that is urged against a seat extending about a passage within the valve housing by a captured compression spring. One end of the spring bears against and is retained by an interior surface of the valve housing and the opposite end bears against and urges the rubbery cup against the valve seat. A valve stem has one end that connects to the valve member within the valve housing and an opposite end that extends externally from the valve housing. The external end of the valve member will typically have a fitting such as a hook or a fastener such as a female thread that connects to a valve handle that incorporates an over center cam mechanism. In the closed position with the handle typically upright, a lower profile edge or surface of the cam rests against an outer surface of the valve body or associated element to exert little or no force against the valve member to urge it outwardly from the valve body so that the valve remains closed. To open the valve, the valve handle is pivoted to urge a higher profile edge or surface against the valve a more upright position about a lobe or lobes of the over center cam which acts to pull the valve stem outwardly relative to the housing. This exerts a compression force on the spring to retract the valve member from the valve seat to allow passage of the beverage through the valve. When the beverage has been dispensed, the handle can be released and the spring will return the valve member to its closes position.

The above described bulk liquid beverage holding vessels such as urns, decanters, jugs, and the like, are commonly utilized in a variety of self service locations such as for dispensing beverages in fast food restaurants, cafeterias, and the like where it is often desired to maximize signage, advertising messages, and to influence product selection by consumers. It may be desired to simply provide larger or more clear than normal signage, such as to indicate "sweet", "caffinated", "unsweet", "decaffeinated", etc., and/or it may be desired to provide branding and/or advertising in closer proximity to the user when making a selection, or literally in the palm of consumer's hand when dispensing a beverage.

The above described vessels are also commonly used by persons that are untrained and/or careless employees, consumers, adolescents, pranksters, elderly, and the like, that unintentionally or intentionally damage the vessel and/or valve, such as by applying too much force when opening or closing. Thus, if a dispensing valve handle is long and also heavy, that can generate substantial leverage that can potentially damage the valve. However, a longer valve that is relatively lightweight has been found to provide good leverage for ease of use by elderly and weaker persons, but will lack the mass to cause damage when abused. A longer handle will also provide increased space for signage, branding, and ad copy.

It is known to provide large tap handles for beer dispensing faucets, having substantial size relative to the faucet to provide large surface area for ad copy, graphics, and other marketing, as well as sufficient mass in lieu of a spring for providing a closing force in opposition to pressures generated by the carbonation of the beer. The shape and size of the known tap handles is advantageous for marketing exposure, feel, and function for dispensing beer, but the mass would be too great for use with valves typically used for dispensing drinks such as tea, coffee, juices, etc., from urns, decanters, brewing vessels, and other bulk beverage holding containers.

Therefore what is sought is a handle for a beverage dispensing faucet of a bulk liquid beverage holding container, that is lightweight and overcomes the problems and shortcomings discussed above, while being ergonometric, provides enlarged prominent area for ad space and other marketing function, and the shape and size of which is quickly, easily, and conveniently changeable as desired or required for different applications and customer preferences.

SUMMARY OF THE INVENTION

What is disclosed is a handle for a beverage dispensing faucet, that has an elongate ergonometric sized and shaped body that is easy to grasp and operate and is relatively lightweight. The handle is configured with a large outer surface to carry optional graphics, branding, advertising, etc., and when installed and operational is upstanding so as to highly visibly and prominently display the advertising, graphics, etc. The handle is additionally configured to allow quickly and easily changing or selecting from different ergonometric bodies and optional advertising, graphics, branding, messaging, etc., as desired or required for a particular application or customer preference.

According to a preferred aspect of the invention, the body of the handle can have any of a variety of ergonometric sectional shapes when viewed from a longitudinal end, including, but not limited to: cylindrical; polygonal, such as rectangular, square, triangular, hexagonal, octagonal, etc.; and any of a variety of other ergonometric profile shapes when viewed from the side, including, but not limited to: straight; curved; tapered; conical; hourglass; barrel; etc. As a non-limiting example, the body can be of molded or extruded plastics material, metal, wood, and any of a variety of composite materials. A predetermined one of the bodies will have a predetermined first length, and the others of the bodies will have a slightly shorter (than the first length), predetermined second length to accommodate adapters, as will be explained. The outer surface of the body can be clear, opaque, and/or include the advertising, branding, messaging, etc. The body can be fully or partially hollow or comprise an internal cavity for reducing weight, and the cavity can contain lighting; one or more objects, solid materials, branding, messaging, etc.; and/or liquids, such as real or imitation coffee beans or grounds, fruit, etc. By ergonometric, what is meant is that the body will be at least largely receivable in the palm of an adult hand and comfortably and functionally graspable by wrapping of multiple fingers about at least about one half of the perimeter of the handle at some location along its length, for pushing and/or pulling the handle.

According to a preferred aspect of the invention, the handle comprises a base having a first surface comprising at least one connector disposed and configured to pivotally or hingedly connect the handle to a valve stem extending outwardly from or on an outer surface of a dispensing faucet which will preferably be of conventional design and operation (valve stem is threaded, and pulled outwardly from the faucet in opposition to a closing spring, to open). The base comprises at least one cam disposed and configured to extend toward the outer surface of the faucet such that when the base is connected to the valve stem and the handle is pivotally or hingedly moved, the at least one cam will slidingly engage or bear against the outer surface of the faucet to exert a force against the valve stem to pull it outward relative to the valve body to open the valve in the known manner to dispense the beverage. According to a non-limiting preferred aspect, the base is disk shaped, just slightly larger in sectional extent than an associated end of the body.

According to another preferred aspect of the invention, the base has a second surface opposite the first surface thereof, including a body mounting element having a predetermined shape and size configured to matingly engage and hold an end of a body to be part of the handle. The body mounting element of the base can, as a non-limiting example, comprise a narrow, annular groove in the second surface adapted to cooperatively matingly receive a narrow, annular edge on or comprising the end of the body. Thus, by cooperative receipt of the annular edge of the body in the groove of the body mounting element, the body is connected to and supported on the faucet. To supplement the securing of the body to the base, the body mounting element preferably has at least one suitable fastener, such as, but not limited to, an internally threaded nut, that threadedly receives an externally threaded element such as a screw or rod, that, in turn, extends at least partially through the body, such as through a longitudinally extending hollow cavity therein, and is secured thereto in a suitable manner to resist anticipated forces exerted thereagainst, e.g., lateral forces manually exerted by users to dispense beverages in the normal manner, e.g., not deliberately attempting to damage the apparatus by exerting a greater force. The fasteners of the body mounting element can be, for instance, but is not limited to, a captured internally threaded nut, a machined or molded internal thread, a threaded shaft or stud.

According to another preferred aspect of the invention, the handle comprises at least one adapter having a first adapter surface that will cooperatively engage the mounting element, e.g., annular groove of the second surface of the body mounting element for mounting securely thereto in place of the edge of a body. The adapter preferably has a disk shape also about the size of the base, and when secured to the base visually and aesthetically integrates therewith. The adapter has a second adapter surface opposite the first adapter surface, including a second body mounting element adapted for mounting a body having a different predetermined sectional shape from the predetermined first sectional shape. As a non-limiting example, the second body mounting element can comprise a narrow, annular groove configured to cooperatively receive a narrow, annular edge on or comprising the end of a body. This enables utilization with bodies having a variety of different sectional shapes, tubular bodies, etc., that can be easily incorporated without requiring a substantial amount of additional different parts. As non-limiting examples, tubular bodies having cylindrical, round, and rounded sectional shapes, polygonal sectional shapes such as triangular, rectangular, square, pentagonal, hexagonal, octagonal, etc., are easily interchangeable and specifiable e.g., according to customer preferences or desires. The adapter will have a hole or aperture therethrough for receiving the receptacle of the base and passage of the externally threaded element, e.g., screw or rod that extends at least partially through the body.

As another preferred aspect of the invention, the handle has a cap or top that secures the end of the body opposite the base. A preferred cap or top has a first surface having an annular groove replicating the predetermined first sectional shape and size, for cooperatively receiving an annular edge on a second end of a body for mounting securely thereto in essentially the same manner as the edge of the mounting element body. The cap or top preferably has an overall disk shape also about the size of the base, but can have any desired other overall shape including a variety of ornamental shapes, as desired or required for a particular application or customer preference. To accommodate other shape bodies, a second adapter can be utilized that has the first adapter surface, e.g., mounting element mimicking shape of a body having the predetermined first sectional shape, for mounting to the cap or top in place of the edge of a body having that shape. The second adapter also has the second adapter surface opposite the first adapter surface, including a second body mounting element, e.g., predetermined shape narrow groove, adapted for mounting to a body having a particular different predetermined sectional shape, e.g., hexagonal, square, etc. Thus, if a body having a shape different than the predetermined first sectional shape is utilized, it can be envisioned that its opposite ends will be cooperatively received respectively in grooves of a base and cap or top having that shape. On the other hand, if a body having a different sectional shape is used, appropriate adapters will be used between the base and the body on one end, and the cap or top and the body on the other end. To further secure the top and any associated adapter, the cap or top can be configured to accommodate the threaded screw or rod if of sufficient length to extend fully through the body.

BRIEF DESCRIPTION OF THE DRAWINGS

FIG. 3 is a perspective view of the handle having a different body of the invention.

FIG. 4 is an exploded perspective view of the handle showing interchangeability of different bodies.

FIG. 5 is an exploded perspective view of the handle showing interchangeability of different bodies.

FIG. 6 is a perspective view of an assembled handle.

FIG. 7 is a perspective view of another assembled handle.

FIG. 8 is a perspective view of still another assembled handle.

FIG. 9 is a top view of a base of the handles of the invention.

FIG. 9A is a sectional view through the base of FIG. 9.

FIG. 10 is a side view of the base of FIG. 9.

FIG. 11 is a top view of a top of the handle.

FIG. 11A is a sectional view through the top of FIG. 11.

FIG. 12 is a side view of the top of FIG. 11.

FIG. 13 is a top view of an adapter of the invention enabling use of a hexagonal shape body on the handle.

FIG. 13A is a sectional view through the adapter of FIG. 13.

FIG. 14 is a side view of the adapter of FIG. 13.

FIG. 15 is a top view of an adapter of the invention enabling use of a square body on the handle.

FIG. 15A is a sectional view through the adapter of FIG. 15.

FIG. 16 is a side view of the adapter of FIG. 15.

DETAILED DESCRIPTION OF PREFERRED EMBODIMENTS OF THE INVENTION

Figure 1:
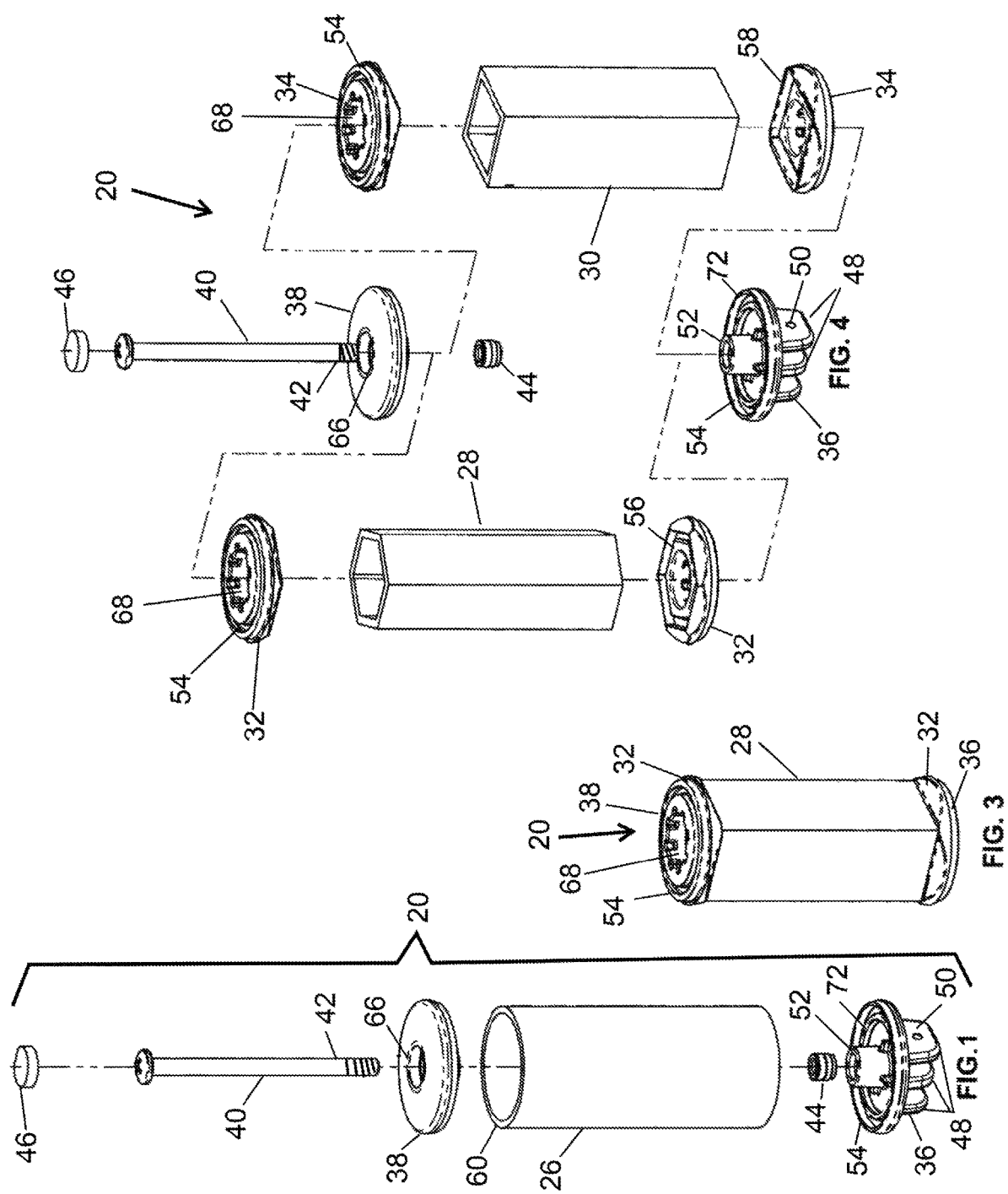
FIG. 1 is an exploded perspective view of one embodiment of a handle of the invention for a beverage dispensing faucet.
Figure 2:
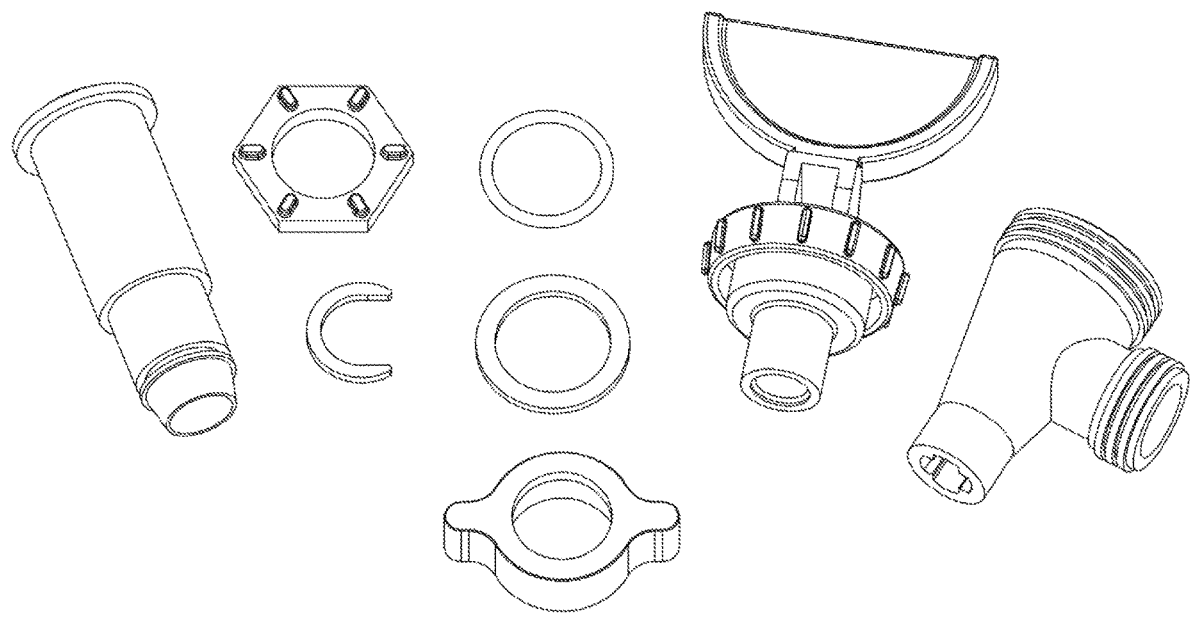
FIG. 2 is a perspective view of components of a representative prior art beverage faucet with which the handle of the invention can be used, showing in particular, a valve assembly and original handle thereof.

Referring now more particularly to the drawings, wherein several preferred embodiments of the invention are illustrated, FIG. 1 is an exploded view of a handle 20 of the invention for use with a prior art beverage dispensing faucet, such as a representative faucet 22 shown in FIG. 2 also shown exploded, as a replacement for conventional handle 24 thereof. Essentially, as is well known, a conventional handle of faucet 22 pivotally attaches to a shaft or plunger of a valve member of the faucet and has a cam or cams that when pivoted bears or bear against an outer surface of the faucet to pull the shaft or plunger outwardly relative thereto, to in turn compress a spring and pull a rubbery valve member from a seat to allow flow through the faucet. A typical application for the faucet illustrated would be on the side of a coffee or tea urn, decanter, jug, and the like commonly employed for making, holding and dispensing brewed beverages such as coffee and tea, and non-fermented beverages such as lemonade, juices and the like.

Handle 20 of the invention has an ergonometric cylindrical sectional shape body 26 which is preferably hollow so as to be lightweight, but is of sufficient length or height to easily enable manually exerting a mechanical advantage over a valve of the faucet 22 for operating the valve thereof with reduced potential for inadvertent or intentional damage as would be present if a heavier handle such as similar to a beer tap handle were to be employed.

FIG. 3 is a perspective view of handle 20 assembled with another embodiment of a body 28 having an hexagonal sectional shape that is also ergonometric.

FIGS. 4 and 5 are exploded perspective views of handle 20, illustrating ease of interchangeability of tubular bodies 26 and 28, and also an ergonometric tubular square body 30 using different disk shaped adapters 32, 34 cooperatively engageable with features on a disk shape base 36 and top 38, all joined together using a quickly and easily installable and removable element, which here comprises a threaded fastener that is an elongate screw 40 having a threaded end 42 that passes through a hole 66 through top 38 and hollow body 26, 28, or 30 and threadedly engages a mating threaded fastener which here comprises a nut 44. Here, nut 44 will be non-rotatably retained or affixed in a receptacle 52 such as by friction, adhesives, molding, or the like, formed within a center region of base 36. When handle 20 is assembled, hole 66 can be plugged using a press or friction fit plug 46 for preventing collection of solids such as dirt and/or fluids, and to provide a smooth aesthetic appearance. Thus, it should be apparent that, either using the base 36 and top 38 alone with a cylindrical tubular body 26, or with adapters 34 that cooperatively engage base 36 and top 38 to allow use of different shape bodies, e.g., but not limited to, hexagonal shape body 28 and square shape body 30, different shape tubular bodies can be utilized and quickly and easily interchanged according to the invention.

FIGS. 6, 7, and 8 show an assembled handle 20 having an elongate hexagonal sectional shape body 28; a cylindrical sectional shape body 26; and an elongate square sectional shape body 30, respectively.

Referring also to FIGS. 9, 9A and 10 illustrate a generally disk shape base 36 having a first surface 70 comprising outwardly projecting cams 48 including laterally aligned apertures 50 therethrough disposed and configured to pivotally or hingedly connect to a valve stem extending outwardly from an outer surface of a faucet such as faucet 22 of FIG. 2. Here, a pin (not shown) will extend through the apertures 50 and mating apertures on the valve stem (not shown) and retained therein in the well known manner to position cams 48 such that when base 36 is pivotally or hingedly moved in connection with the valve stem in a first predetermined direction, the cams 48 will bear against the outer surface of the faucet to move the valve stem outward relative thereto to open the faucet and dispense a beverage. Base 36 has a second surface 72 opposite first surface 70, having at least one mounting element 74 having a predetermined shape configured to matingly engage an element on a selected one of the bodies for mounting the body securely to base 36. Here, as a non-limiting selection, mounting element 74 has a circular sectional shape of body 26 and comprises a narrow annular groove 54 thereabout that cooperatively receives an annular longitudinal edge 60 of body 26, groove 54 and edge 60 each having a round shape for this purpose. Groove 54 has a minor or inside diameter denoted D that corresponds to an inside diameter of hollow body 26, as shown in FIG. 9A. Also illustrated is a central boss on the second surface 72 that incorporates the receptacle 52 for receiving and holding nut 44 used for assembling handle 20. Also as a non-limiting example, it is contemplated that base 36 will be of injection molded construction, and that most or all of the above discussed features will be formed in the molding process.

FIGS. 11, 11A, and 12 illustrate a top 38 for use with the handle 20 of the invention, including a first surface 76 having at least one mounting element 74 having the predetermined sectional shape, here, round or circular, configured to cooperatively engage a selected one of the bodies, again the circular shape edge of body 26 for securely mounting top 38 to the body, in the form of a narrow annular groove 54 thereabout that cooperatively receives an annular longitudinal edge 60 of body 26, groove 54 again having a minor or inside diameter denoted D shown in FIG. 11A that closely matches the inside diameter of the body 26. Top additionally includes a hole 66 therethrough for passage of screw 40 but not a screw head thereof, for more securely holding the assembly together, and a receptacle for securely receiving plug 46 to conceal the screw head.

FIGS. 13, 13A, and 14 show an adapter 32 configured for adapting the handle 20 of the invention for use with the hexagonal shape body 28 as discussed above; and FIGS. 15, 15A, and 16 show adapter 34 for adapting for use with square shape body 30, as also discussed above. Each of the adapters 34, 36 preferably has an overall disk shape, having a sectional extent of about the base 36 and top 38 so as to aesthetically and visually blend therewith. Each of the adapters 34, 36 has a first adapter surface 78 that will cooperatively engage the mounting element 74, e.g., annular groove 54 of the second surface of the body mounting element, and includes an annular mating surface having a diameter D for matingly engaging a surface bounding groove 54 for mounting securely thereto in place of the round annular edge 60 of a body. Adapter 32 has a second adapter surface 80 and adapter 34 has a second adapter surface 82, opposite the first adapter surface 78, including a second body mounting element 84 or 86, respectively, adapted for mounting a body 28 or 30, respectively, having a different predetermined sectional shape (e.g., hexagonal or square) from the predetermined first sectional shape (e.g., round). As a non-limiting example, the second body mounting elements 84 and 86 can comprise a narrow, annular groove 56 (hexagonal) or 58 (square) configured to cooperatively receive annular edge 62 or 64 on or comprising the end of a body 28 or 30 to be used, respectively. Each adapter 32, 34 also has a hole 68 therethrough, for receiving receptacle 52 of base 36, any similar structure on top 38, and passage of screw 40. Adapters 32 and 34 facilitate use with bodies having a variety of different sectional shapes, tubular bodies, etc., that can be easily incorporated without requiring a substantial amount of additional different parts. Again, in this regard, the invention is not limited to use of bodies having cylindrical, round, and rounded sectional shapes, and hexagonal and square shapes, triangular, pentagonal, octagonal, oval, etc., also being contemplated, according to customer preferences or desires.

As noted above, as an advantage of the invention, a substantial portion of the components of the handle can be of lightweight plastics composition, such that the handle will be less likely to pose a risk of damage, and will be easier to use. As another preferred aspect, it can be observed that the tubular bodies 26, 28, and 30 of handle 20 of the invention can be hollow, providing a cavity for receiving objects, such as beans, seeds, imitation fruit, and the like, if desired for a particular application. As a non-limiting example, the cavity can contain small imitation lemons and/or raspberries, to represent contents such as a lemonade, raspberry lemonade, or the like. The cavity can also contain lighting, a battery power source, and related circuitry, if desired.

As still another preferred aspect, the exterior of bodies 26. 28, and 30, as well as other exposed regions of handle 20, can be wrapped with graphics, signage, add copy, and the like, as desired or required for a particular application.

It can be observed that it is contemplated according to the invention, that interchangeable shape elements can be utilized to give the beverage dispensing handle different appearances, for different customers, products, seasons, effects, and other desired purposes, and at the time of manufacture or assembly the different shape handles can be easily and quickly incorporated with little additional expense.

It can be also observed that the dimensions of the handle of the invention can vary widely, including length or height, and thickness, and that a wide variety of shapes when viewed from the side can be utilized, including, but not limited to, straight, curved, rounded, hourglass, barrel, helical, and other common or unusual shapes.

In light of all the foregoing, it should thus be apparent to those skilled in the art that there has been shown and described an ergonometric handle for a beverage dispensing faucet that provides one or more of the advantages and overcomes one or more of the limitations, set forth above. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A handle for a beverage dispensing faucet, comprising:
a base having a first surface comprising at least one cam extending in a first direction therefrom and having an aperture therethrough, and a second surface opposite the first surface and having at least one mounting element extending in a second direction opposite the first direction and having a predetermined first shape;
a generally disk shape adapter having a first surface replicating the predetermined first shape, matingly engaged with the at least one mounting element of the base to mount the adapter to the base, the adapter having a second surface having at least one mounting element extending in the second direction and defining a predetermined second shape different from the predetermined first shape; and
an annular body having an edge replicating the predetermined second shape, matingly engaged with the at least one mounting element of the second surface of the adapter to mount the annular body to the adapter extending in the second direction therefrom, and a fastener extending through and securing the annular body and the adapter to the base.

2. The handle of claim 1, wherein the predetermined first shape is circular.

3. The handle of claim 1, wherein the predetermined first shape is polygonal.

4. The handle of claim 3, wherein the predetermined first shape is square.

5. The handle of claim 3, wherein the predetermined first shape is hexagonal.

6. The handle of claim 1, wherein the at least one mounting element of the base comprises an annular groove about the second surface and facing in the second direction.

7. The handle of claim 6, wherein the second surface of the base comprises a receptacle surrounded by the annular groove.

8. The handle of claim 1, wherein the predetermined second shape is polygonal.

9. The handle of claim 1, wherein the predetermined first shape is circular and the predetermined second shape is polygonal.

10. The handle of claim 1, wherein the at least one mounting element of the second surface of the adapter comprises an annular groove facing in the second direction.

11. The handle of claim 1, wherein the base further comprises a centrally located raised element extending from the second surface thereof and the adapter is configured to fit thereabout.

12. The handle of claim 1, further comprising:
a generally disk shape top including a surface having at least one mounting element having the predetermined first shape matingly engaged with a second disk including at least one mounting element having the predetermined second shape, matingly engaged with an opposite end of the annular body having the predetermined second shape.

13. The handle of claim 1, wherein the annular body comprises a tube.

14. The handle of claim 1, further comprising:
a generally disk shape top including a surface having at least one element defining the predetermined second shape and configured to matingly engage an opposite end of the second annular element having the predetermined second shape.

15. The handle of claim 1, further comprising an element that extends from the second surface of the base to attach a tubular element thereto.

* * * * *